April 7, 1970     R. L. SORENSEN ET AL     3,505,141
MOLDING AND LAMINATING METHOD
Original Filed Jan. 21, 1964
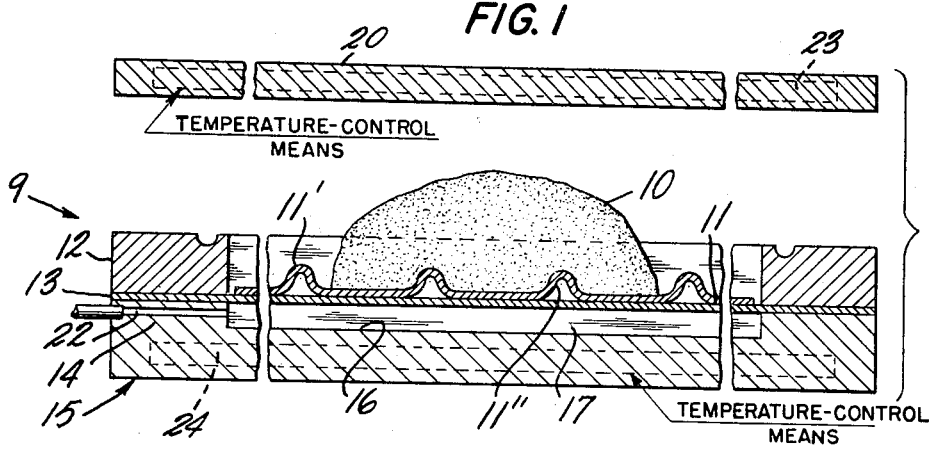
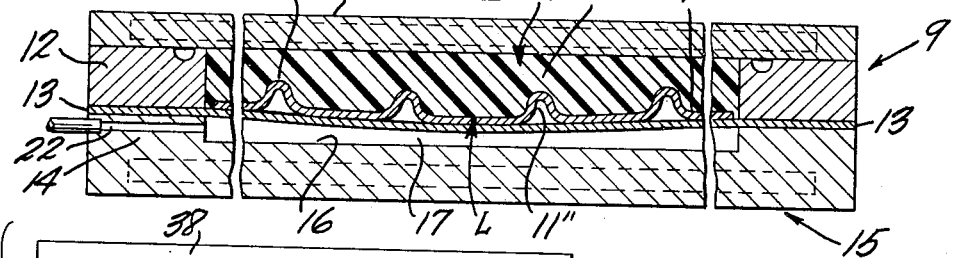
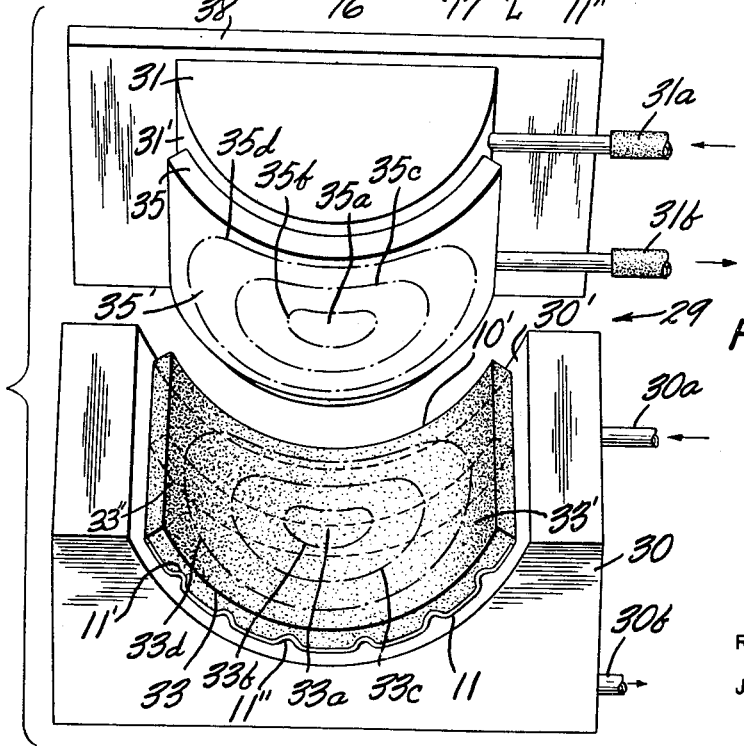
INVENTORS
ROBERT L. SORENSEN,
EARL E. BRODHAG &
JOHN V. CASANOVA

United States Patent Office 3,505,141
Patented Apr. 7, 1970

3,505,141
MOLDING AND LAMINATING METHOD
Robert L. Sorensen and Earl E. Brodhag, Westport, Conn., and John V. Casanova, Racine, Wis., assignors to Time, Incorporated, New York, N.Y., a corporation of New York
Original application Jan. 21, 1964, Ser. No. 339,257. Divided and this application May 31, 1967, Ser. No. 642,567
Int. Cl. B29c 17/04
U.S. Cl. 156—214                                7 Claims

ABSTRACT OF THE DISCLOSURE

A molded product is formed by heating a mold substance to mold it to a desired shape and applying pressure thereto during a subsequent cooling cycle to prevent vaporization of volatile components in the mold substance during the cooling cycle. A surface of the molded product is laminated to the surface of another article, the lamination extending progressively to the limits of a prescribed area without surrounding any portion of one of the two laminated surfaces which is out of contact with the other surface.

CROSS-REFERENCE TO RELATED APPLICATION

This is a division of our copending application Ser. No. 339,257, filed Jan. 21, 1964, for "Molding and Laminating Apparatus and Methods, and Products Thereof," now abandoned.

BACKGROUND OF THE INVENTION

This invention relates to certain novel apparatus, methods and products. More particularly, it relates to molding methods (especially methods of molding of a substance which has or may have a volatile component tending to vaporize or expand when the substance changes from a molding condition to a use condition), to molded products, and to the uniting or laminatanig of a first surface (which may be a surface of a product molded in accordance with the invention) to a second surface. The invention has broad applicability but is particularly adapted for use in the printing art.

There have recently been developed electrotype printing plates in which the backing is of plastic rather than lead. To be used safely on modern high-speed presses, all electrotypes, whether lead- or plastic-backed, must be bonded to sheets of stronger material such as aluminum or magnesium. Plastic backings and the lamination of backings, whether plastic or lead, to sheets of stronger material provide numerous advantages which are well known to workmen skilled in the art and which need not be detailed here. There are, however, certain attendant disadvantages.

Conventional methods and apparatus directed to the making of electrotypes having plastic backings involve the use of molds generally metallic because of their permanence, into which a suitable plastic material to be molded is placed. The plastic material to be molded is heated within the mold so that it acquires the shape of the mold then cooled so that it is set in the shape of the mold. Inasmuch as plastics, particularly the tough, strong thermoplastic polymers such as the synthetic linear polyamides which are desirable for electrotype backings and which obtain much of their strength through a degree of crystallinity and hydrogen bonding, generally have a higher coefficient of expansion and contraction than metals, the plastic shrinks more during the cooling cycle than does the mold, producing a condition in which the mold cavity is not filled under pressure. As a result, any air which may be present in the plastic then expands, gas bubbles due to vaporization of volatile components such as water in the plastic form in local "hot spots," where the plastic is still fluid, and random shrinkage lines develop.

The molded product of conventional apparatus and methods is thus not entirely satisfactory; even if relatively free of bubbles, it must be further treated, for example by grinding its back to remove the shrinkage lines. To eliminate gas bubbles, workmen in the art employ other conventional techniques, such as the provision in the plastic of coarse woven cloths or matted sheets of fibrous material intended to define venting channels for gas pockets and "bumping" or "degassing" of the mold by an opening and shutting of the press while the plastic is molten to allow the entrapped gas to escape. These techniques involve additional steps and expense and sometimes a high degree of judgment by the operator and may degrade the plastic and fail to eliminate the bubbles.

The bonding of the molded plastic to the back-up plate may be accomplished in the manner shown, for example, in a U.S. patent to Faeber, No. 3,045,585. Conventional apparatus and methods, such as those disclosed in the patent, have, however, the disadvantage that they involve the inadvertent entrapment of gas bubbles between the plastic and the back-up plate.

An object of the present invention is to remedy the problems outlined above. In particular, an object of the invention is to provide methods directed to the molding of a substance (especially a substance which has or may have a volatile component tending to vaporize or expand when the substance changes from a molding condition to a use condition, whereby the volatile component is prevented from vaporizing or expanding) and to provide for the uniting of a first surface (which may be a surface of the molded substance) to a second surface over a designated area without the entrapment of gas bubbles.

SUMMARY OF THE INVENTION

These and other objects are attained in accordance with the invention by forming a mold cavity about a substance which has or may have a volatile component tending to vaporize or expand when the substance changes from a molding condition to a use condition to mold the substance into a desired shape, changing the substance to a use condition, and, simultaneously with the changing, maintaining sufficient pressure on the substance to prevent vaporization or expansion of the volatile component. Where the molded substance is a backing for an electrotype printing plate, it preferably has a thickness which is a maximum at a given location and which decreases continuously with increasing distance from that location. A surface of the molded substance is then united to a second surface over a designated area by bringing successive portions of the first-named surface into contact with successive portions of the second surface to form a lamination extending progressively to the limits of the area without surrounding any portion of the first-named surface which is out of contact with the second surface.

BRIEF DESCRIPTION OF THE DRAWING

For an understanding of further aspects of the invention, reference is made to the following detailed description of an exemplary embodiment thereof and to the accompanying figures of the drawings, in which:

FIGURE 1 is a sectional schematic elevation of an exemplary embodiment of molding apparatus adapted to facilitate performance of a first step in the method of the invention and in the open position;

FIGURE 2 is a sectional schematic elevation of the apparatus of FIGURE 1 in the closed position; and FIGURE 3 is a perspective of an exemplary embodiment of laminating apparatus according to the invention adapted to facilitate performance of an additional step in the method of the invention.

DESCRIPTION OF THE PREFERRED EMBODIMENT

FIGURE 1 shows apparatus 9 for molding a material such as a polyamide molding powder into a product such as a backing for an electrotype printing plate. Preformed synthetic linear polyamides, commonly known as nylons, a well-recognized class of substances, may suitably be the material used. Nylons are characterized by extreme hardness and excellent wearing qualities.

In accordance with the invention, a metered amount of polyamide molding powder 10 is deposited on the back side 11′ of an electrotype shell 11 surrounded by a "picture-frame" assembly 12. The electrotype shell 11 is conventional, being an electroformed sheet of copper and nickel and having its front side 11″ formed with a relief surface and its back side 11′ clean and dry. The picture-frame assembly 12 rests on a flexible sheet 13 which in turn rests on a peripheral portion 14 of a mold base 15 having a center portion 16. The peripheral portion 14 is raised with respect to the center portion 16, so that the flexible sheet 13 is supported peripherally but not elsewhere.

The flexible sheet 13 and the mold base 15 form an airtight compartment 17 therebetween provided, however, with an aperture 22 through which compressed air or another fluid under pressure may be introduced into the compartment 17 for a purpose hereinafter explained. A mold closure 20 is engageable with the picture-frame assembly 12 so that the flexible sheet 13, picture-frame assembly 12, and mold closure 20 are wall means defining, in the closed position (FIGURE 2), a mold cavity 21 within which the polyamide molding powder 10 is contained.

The amount of polyamide molding powder deposited on the back face 11′ of the electrotype shell 11 is metered so that, when the mold closure 20 is closed on the picture-frame assembly 12, the polyamide molding powder 10 completely fills the mold cavity, there being little or no air entrapped therein, and, in fact, adjusts or stretches the flexible sheet 13 downwardly (FIGURE 2). A press temperature of 350° F. is maintained while the mold closure 20 is slowly closed under a low total force (about 15 to 200 pounds). As the molding powder is pressed between the heated electrotype shell 11 and mold closure 20, it gradually melts and assumes the shape of the mold cavity. The amount of downward flexing of the flexible sheet 13 as the mold closes is controlled by the thickness of the sheet 13, the material of which it is made, the amount of molding powder 10 deposited on the electrotype shell 11, and other factors which workmen skilled in the art will understand.

When the mold is closed, the pressure of the mold closure 20 and mold base 15 inwardly on the picture-frame assembly 12 and periphery of the flexible sheet 13 is raised to at least 200 pounds per square inch, and air or another fluid under a pressure of 50 to 150 pounds per square inch is introduced into the airtight compartment 17 through the aperture 22, which is connected to conventional means (not shown) such as a tank of compressed air or an air compressor. This subjects the plastic 10′ to the combined pressure due to the stretched condition of the flexible and resilient sheet 13 and the compression of the air or other fluid within the airtight compartment 17. This pressure prevents the vaporization of volatile materials which may be in the plastic and the expansion of any air which may be in the plastic and hence substantially prevents the formation of gas bubbles in the plastic. Moreover, it forces the plastic into the minute crevasses on the back side 11′ of the shell 11.

The heat source is then removed from the press and the cooling cycle begun. The air pressure in the airtight compartment 17 may be continuously maintained or momentarily reduced and the closed mold assembly transferred to a second press with cold mold platens. In either case, means such as temperature-control means 23, 24 are provided for bringing the molded plastic from a molding temperature or first condition to a use temperature or second condition: i.e., a temperature or other condition in which the molded plastic can be put to its intended use, for example, in the printing art.

In accordance with the invention, the molded plastic is substantially free of gas bubbles and random shrinkage lines and hence need be submitted to no further processing. The manufacture of electrotype printing plates is thus simplified and rendered more rapid and economical, involving virtually no waste of material. No adhesives are required either in sheet or liquid form, and a saving in purchase, handling, and application costs results. Moreover, powders containing as much as 2.5% of water are successfully molded in accordance with the present invention, whereas with prior art apparatus and methods it has not proved possible to achieve success with powders containing more than 0.2% of water.

Further, the molding method of the invention permits precise caliper control of the molded product, such control being of particular importance in connection with the laminating apparatus method of the invention. In particular, the overcharging of the mold cavity 21 is sufficient to assure that the thickness of the molded backing is a maximum at a given location, such as L, and decreases continuously in all directions with increasing distance from the location. This construction of the molded backing facilitates the laminating thereof to a sheet of stronger material in the following manner.

The laminating method of the invention is directed to the uniting of a first surface such as a surface of a molded plastic backing for an electrotype shell to a second surface such as a surface of a back-up or base plate of aluminum of another relatively strong material.

FIGURE 3 is a perspective of laminating apparatus 29 facilitating performance of the method of the invention and comprising a pair of precision dies 30, 31. For the sake of clearly showing points 33a and 35a and lines 33b–33d and 35b–35d referred to hereinafter in connection with a description of the operation of the laminating apparatus, the die 30 is shown with its near end pivoted downwardly with respect to the die 31 (or the die 31 with its near end pivoted upwardly with respect to the die 30). The dies 30, 31 may be similar to those disclosed in the previously-mentioned U.S. Patent No. 3,045,585 in providing, for example, an inlet pipe 30a, an outlet pipe 30b, and connecting piping (not shown) for the circulation of a relatively cool fluid through the die 30 for the purpose of maintaining the molded plastic 10′ in the vicinity of the electrotype shell 11 in the solid state and an inlet pipe 31a, and outlet pipe 31b, and connecting piping (not shown) for the circulation of a relatively warm fluid through the die 31 for the purpose of simultaneously bringing successive portions of the molded plastic 10′ remote from the shell 11 to the liquid or semi-liquid state. The bond between the electrotype shell 11 and the molded plastic 10′ can thus be preserved while a lamination of the plastic 10′ with a base plate 35 of aluminum or a similar material is formed. The die 31 is then cooled by the circulation of a relatively cool fluid through the inlet pipe 31a, the outlet pipe 31b, and the connecting piping (not shown), whereupon the laminated product can be mounted on a printing press in the usual manner.

The apparatus of FIGURE 3 thus facilitates uniting a first surface 33′ of the molded plastic 10′ to a second surface 35′ of the aluminum or magnesium base plate 35 over a designated area. The surface 35′ is convexly-cylindrically curved and has a melting temperature higher than that of the surface 33′. Means such as the lower concave die 30 or the molding apparatus disclosed in connection with FIGURES 1 and 2 are provided for curving the surface 33′ complementally with respect to the curvature of the surface 35' but to a degree slightly less than the degree of curvature of the surface 35'. From another standpoint, the surface 33' is concavely curved in planes normal to the axis of curvature of the surface 35' to a degree slightly less than the degree of curvature of the surface 35' and is convexly curved in planes of the axis of curvature of the surface 35'. Thus, a section on the broken line 33" is thicker at its center than at its ends.

The die 31 serves as means for heating the surface 35' to a temperature above the melting temperature of the surface 33', and the die 31 and an upper platen 38 (or the die 30) serve as means for bringing the surfaces 33' and 35' together. Owing to the relative curvatures of the surfaces, successive portions of the surface 33' are brought into contact with successive portions of the surface 35' to form a lamination extending progressively to the limits of the area of the two surfaces in contact with each other without surrounding any portion of the first surface which is out of contact with the surface 35'. Thus, the points 33a and 35a first establish contact with each other to form an inchoate lamination; later, the lines 33b and 35b, located outwardly from the points 33a and 35a, respectively, establish contact with each other; later, the lines 33c and 35c, located outwardly from the lines 33b and 35b, respectively, establish contact with each other; still later, the lines 33d and 35d, located outwardly from the lines 33c and 35c, respectively, establish contact with each other; and so forth to the limit of the area of the surface 33' or other designated area over which a lamination is to be formed.

Where the plastic employed is a nylon sold by E. I. du Pont de Nemours & Co. under the trademark Zytel 61 or Zytel 63, the die 30 in the vicinity of the shell 11 is not allowed to become hotter than 100° F., and the laminating pressure is not allowed to exceed 66 pounds per square inch.

It has been found that good adhesion between nylon and the aluminum mounting plate can be obtained without the use of an adhesive by preconditioning the aluminum surface. A medium-strength bond is achieved by first cleaning and etching the aluminum in a 160° F., 3%-by-weight bath of sodium hydroxide for a period of three minutes. A superior bond whose strength exceeds that of the nylon is obtained by a cleaning of the aluminum in a 3%-by-weight solution of trisodium phosphate for a period of one minute at a temperature of 180° F. followed by a five-minute anodizing treatment in a 50%-by-weight phosphoric acid bath using a positive DC potential of 15 volts on the aluminum and keeping the acid bath between 65° F. and 80° F.

The laminating method of the invention is highly economical and efficient, resulting in a superior product with a waste of less than 1% of the polymer, compared to a waste of polymer of about 25% in the case of conventional methods and apparatus.

The molding methods described in connection with FIGURES 1 and 2 and the laminating method described in connection with FIGURE 3 co-operate in the following novel way. By slightly overcharging the molding apparatus, the molded product produced by the apparatus of FIGURES 1 and 2 is made slightly thicker at a location such as L, which may be the center thereof, than at other portions thereof. Moreover, the thickness decreases continuously in all directions with increasing distance from L. Therefore, the proper relationship between the curvature of the surface 33' and that of the surface 35' can be established even though the dies 30 and 31 are conventional. That is, even though the surface 30' has a degree of concavity matched in a conventional way to the degree of convexity of the surface 31', the surface 33' is given, when the molded product 10' is hand-fitted together with an electrotype shell 11 onto the surface 30', a degree of curvature complemental to but less than the degree of curvature of the surface 35' by the requisite amount.

There is thus provided in accordance with the invention novel and highly-effective methods and apparatus directed to the molding of a substance, particularly a substance which has or may have a volatile component tending to vaporize when the substance changes from a molding condition to a use condition, to the uniting of a first surface to a second surface over a designated area, and to the products thus produced.

Many modifications in form and detail of the representative embodiment of the invention disclosed herein will occur to workmen having the ordinary skill of the art. For example, materials other than polyamide powder may be employed as the molding material, examples being polyethylene, the syntactic polymers made from ethylene and propylene, polyvinyl chloride, and copolymers of vinyl and vinylidene chlorides.

We claim:

1. A method of uniting a surface of a molded plastic article to a second curved surface over a designated area comprising the steps of curving said surface of said molded plastic article and starting at a location spaced apart from the perimeter of said area, bringing successive portions of said molded plastic article surface into contact with successive portions of said second surface to form a lamination extending progressively to the limits of said area without surrounding any portion of said molded plasic article surface which is out of contact with said second surface.

2. A method of uniting a surface of a molded plastic article to a second curved surface over a designated area, said second surface having a melting temperature higher than that of said molded plastic article surface, comprising the steps of curving said surface of said molded plastic article, heating said second surface to a temperature above the melting temperature of said molded plastic article surface, then, starting at a location spaced apart from the perimeter of said area, bringing successive portions of said molded plastic article surface into contact with successive portions of said second surface to melt said successive portions of said molded plastic article surface and form a lamination extending progressively to the limits of said area without surrounding any portion of said molded plastic article surface which is out of contact with said second surface, and cooling said second surface to a temperature below the melting temperature of said molded plastic article surface.

3. A method of uniting a surface of a molded plastic article to a second curved surface over a designated area comprising the steps of curving said surface of said molded plastic article, bringing a small portion of said molded plastic article surface into contact with a small portion of said second surface to form an inchoate lamination substantially at the center of said area, and bringing successive portions of said molded plastic article surface outwardly from said inchoate lamination into contact with successive portions of said second surface outwardly from said inchoate lamination to extend said lamination progressively to the limits of said area without surrounding any portion of said molded plastic article surface which is out of contact with said second surface.

4. A method of uniting a first surface to a convexly-curved surface over a designated area, said convexly-curved surface having a melting temperature higher than that of said first surface, comprising the steps of curving said first surface complementally with respect to the curvature of said convexly-curved surface but to a degree slightly less than the degree of curvature of said convexly-curved surface, heating said convexly-curved surface to a temperature above the melting temperature of said first surface, then, starting at a location spaced apart from the perimeter of said area, bringing successive portions of said first surface into contact with successive portions of said convexly-curved surface to form a lamination extending progressively to the limits of said area without surrounding any portion of said first surface which is out of contact with said convexly-curved surface, and cooling said convexly-curved surface to a temperature below the melting temperature of said first surface.

5. A method of uniting a first surface to a convexly-cylindrically-curved surface over a designated area, said convexly-cylindrically-curved surface having a melting temperature higher than that of said first surface, comprising the steps of concavely curving said first surface in planes normal to the axis of curvature of said convexly-cylindrically-curved surface to a degree slightly less than the degree of convexity of said convexly-cylindrically-curved surface, convexly-curving said first surface in planes of said axis, heating said convexly-cylindrically-curved surface to a temperature above the melting temperature of said first surface, then starting at a location spaced apart from the perimeter of said area, bringing successive portions of said first surface into contact with successive portions of said convexly-cylindrically-curved surface to form a lamination extending progressively to the limits of said area without surrounding any portion of said first surface which is out of contact with said convexly-cylindrically-curved surface, and cooling said convexly-cylindrically-curved surface to a temperature below the melting temperature of said first surface.

6. A method of molding a plastic substance which has a volatile component tending to vaporize or expand when said substance cools from a molding temperature to a temperature at which the substance can be put to its intended use and uniting a first surface to a second curved surface over a designated area, said first surface being a surface of a molded plastic article produced from said substance, comprising the steps of forming a mold cavity about said substance at a molding temperature to mold said substance into a desired shape, cooling said substance to a temperature at which it can be put to its intended use, maintaining, simultaneously with said cooling, sufficient expansion of said volatile component, whereby a molded plastic article is prduced, curving said first surface of said molded plastic article, and then starting at a location spaced apart from the perimeter of said area, bringing successive portions of said first surface of said molded plastic article into contact with successive portions of said second surface to form a lamination extending progressively to the limits of said area without surrounding any portion of said first surface which is out of contact with said second surface.

7. A method of molding a plastic substance into a backing for an electrotype printing plate, which plastic substance has a volatile component and contracts on cooling from molding temperature to use temperature, and of uniting a first surface to a convexly-cylindrically-curved surface over a designated area, said first surface being a surface of said substance and said convexly-cylindrically-curved surface having a melting temperature higher than that of said first surface, comprising the steps of forming a cavity about said substance at molding temperature to mold said substance into a backing for an electrotype printing plate, cooling said substance to use temperature, contracting said mold cavity simultaneously with said cooling to maintain sufficient pressure on said substance to prevent vaporization and expansion of said volatile component, concavely curving said first surface in planes normal to the axis of curvature of said convexly-cylindrically-curved surface to a degree slightly less than the degree of convexity of said convexly-cylindrically-curved surface, convexly curving said first surface in planes of said axis, heating said convexly-cylindrically-curved surface to a temperature above the melting temperature of said first surface, then, starting at a location spaced apart from the perimeter of said area, bringing successive portions of said first surface into contact with successive portions of said convexly-cylindrically-curved surface to form a lamination extending progressively to the limits of said area without surrounding any portion of said first surface which is out of contact with said convexly-cylindrically-curved surface, and cooling said convexly-cylindrically-curved surface to a temperature below the melting temperature of said first surface.

References Cited

UNITED STATES PATENTS

| | | | |
|---|---|---|---|
| 2,654,913 | 10/1953 | Maier | 264—268 |
| 2,684,774 | 7/1954 | Aichele | 264—268 X |
| 3,045,585 | 7/1962 | Faeber | 156—583 X |

HAROLD ANSHER, Primary Examiner

R. A. KILLWORTH, Assistant Examiner

U.S. Cl. X.R.

156—245, 311, 322; 264—268, 271

PO-1050
(5/69)

UNITED STATES PATENT OFFICE
CERTIFICATE OF CORRECTION

Patent No. 3,505,141     Dated April 7, 1970

Inventor(s) Robert L. Sorensen, Earl E. Brodhag & John V. Casanova

It is certified that error appears in the above-identified patent and that said Letters Patent are hereby corrected as shown below:

Col. 1, line 40, "laminataing" should read --laminating--;
Col. 4, line 25, after "apparatus" insert --and--;
Col. 6, line 27, "plasic" should read --plastic--; and
Col. 7, after line 36, insert --pressure on said substance to prevent vaporization or--.

SIGNED AND
SEALED
AUG 25 1970

(SEAL)
Attest:

Edward M. Fletcher, Jr.
Attesting Officer

WILLIAM E. SCHUYLER, JR.
Commissioner of Patents